July 28, 1964 E. B. WILFORD 3,142,455
ROTARY VERTICAL TAKE-OFF AND LANDING AIRCRAFT
Filed Dec. 17, 1962 5 Sheets-Sheet 3

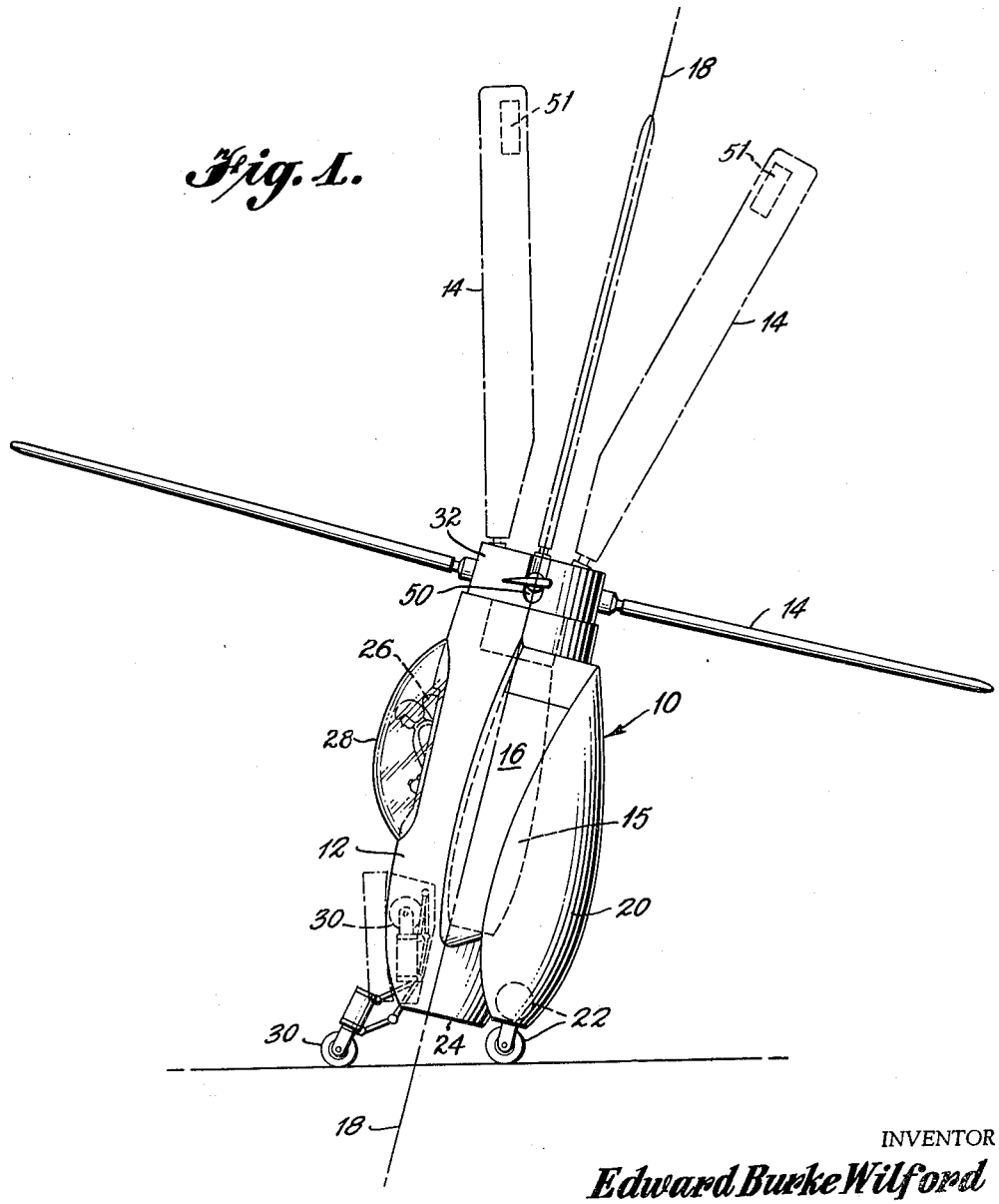

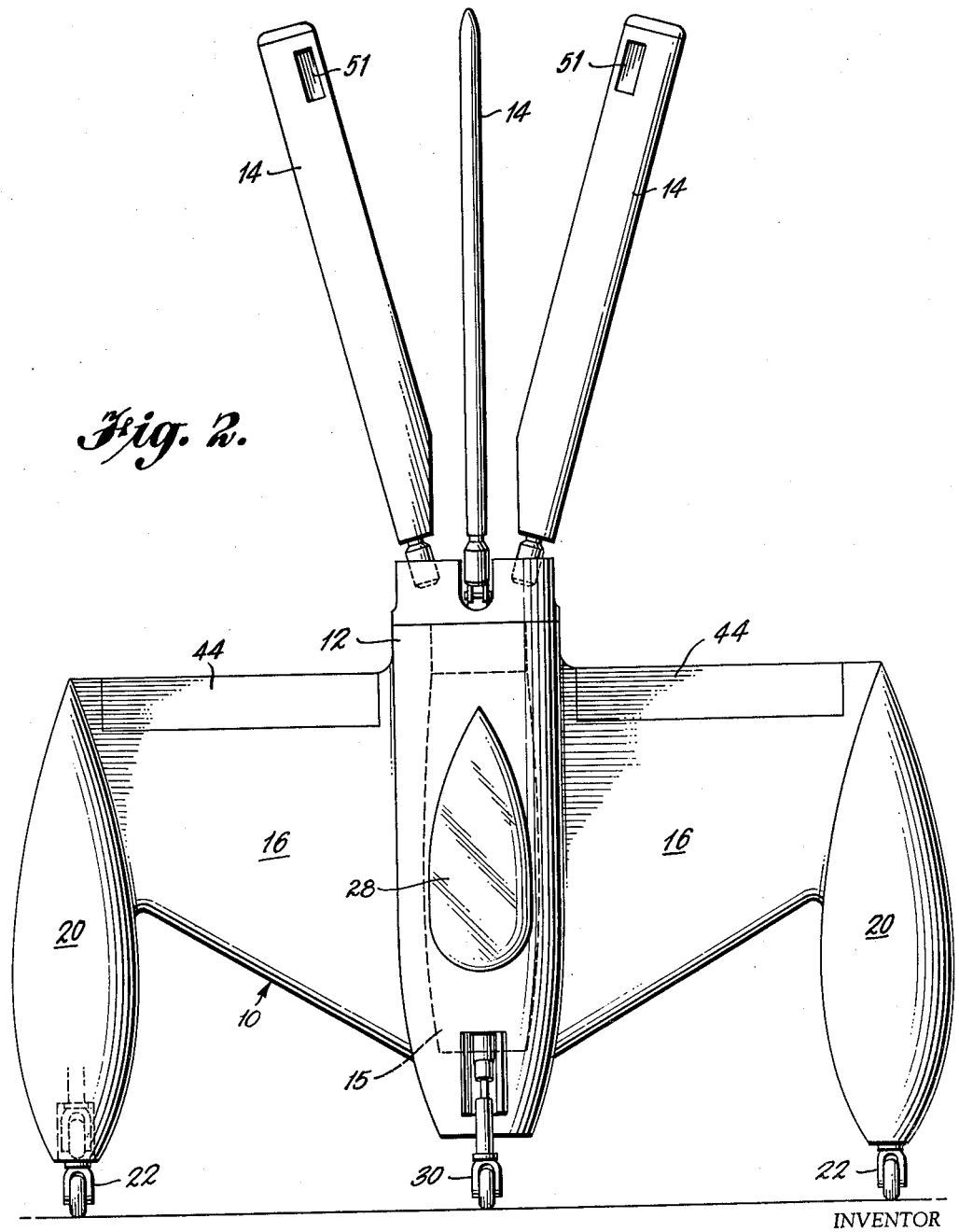

INVENTOR
*Edward Burke Wilford*

BY *Stevens, Davis, Miller & Mosher*
ATTORNEYS

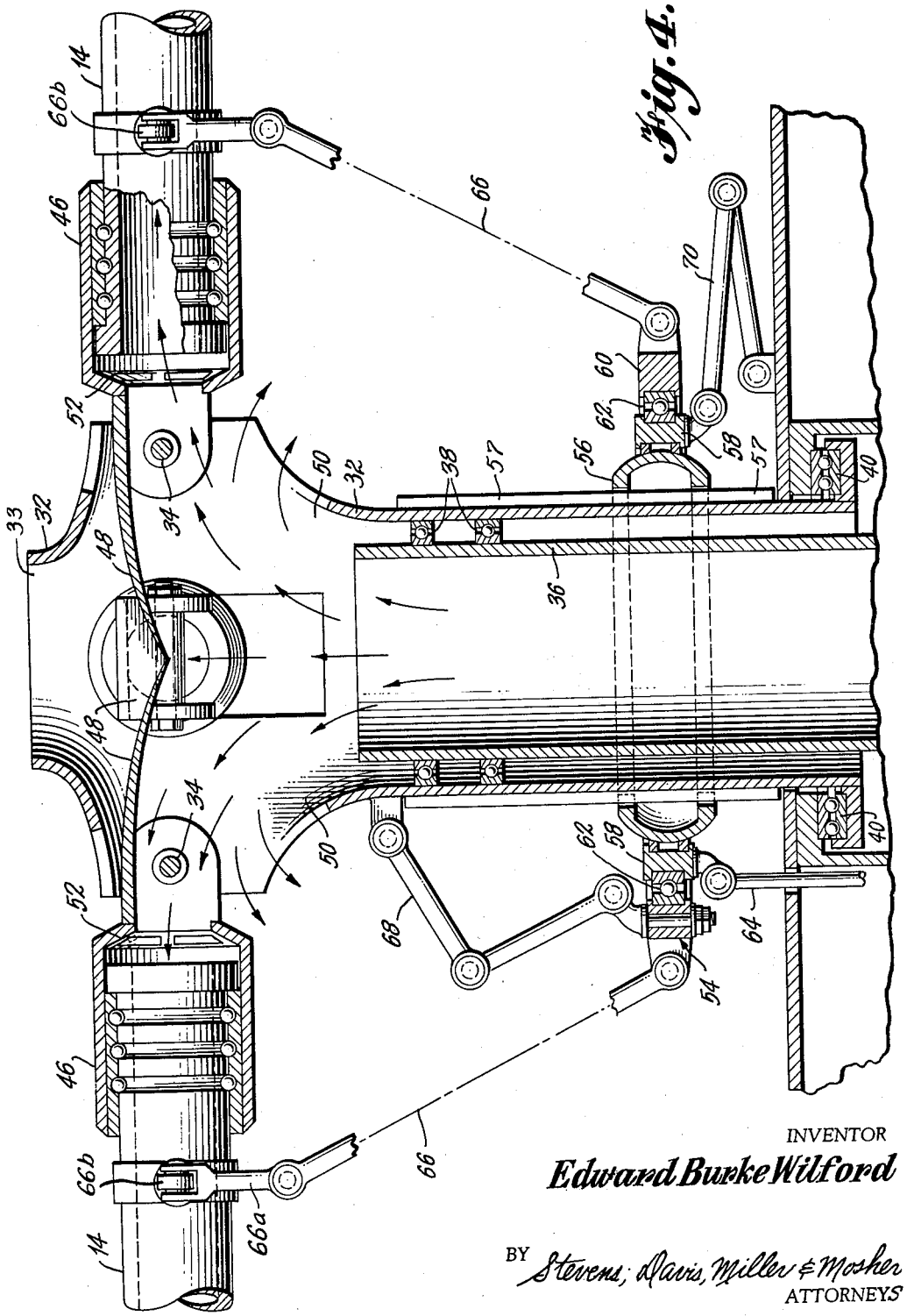

July 28, 1964 E. B. WILFORD 3,142,455
ROTARY VERTICAL TAKE-OFF AND LANDING AIRCRAFT
Filed Dec. 17, 1962 5 Sheets-Sheet 5

INVENTOR
Edward Burke Wilford

BY Stevens, Davis, Miller & Mosher
ATTORNEYS

United States Patent Office 3,142,455
Patented July 28, 1964

3,142,455
ROTARY VERTICAL TAKE-OFF AND LANDING
AIRCRAFT
Edward Burke Wilford, 300 Linden Lane,
Merion Station, Pa.
Filed Dec. 17, 1962, Ser. No. 249,966
8 Claims. (Cl. 244—7)

The present invention relates to a versatile aircraft, and more particularly to a versatile aircraft capable of both vertical and horizontal flight by feathering rotor blades to a trailing position to serve as fixed wing control surfaces.

This application relates to my application Ser. No. 815,772, filed May 22, 1959, now abandoned.

In general, a convertible aircraft capable of vertical and horizontal flight, is a flying machine which combines the most desired flight characteristics of rotary-winged aircraft with those of fixed-wing aircraft. An RVTO, herein defined as a nose sitting rotary vertical take-off aircraft, is a rotary-wing vertical or steep take-off aircraft wherein the rotor is used for take-off and power-off descent; and, in high speed flight, the rotor is feathered in a trailing position to become, if deemed desirable, an empennage for the aircraft, if not, a conventional tail structure is provided. In high speed flight the aircraft is aerodynamically supported by a fixed-wing or wing-body combination.

The rotary vertical take-off aircraft differs from conventional jet powered aircraft and straight vertical take-off aircraft in that it may fly faster, higher, and maneuver more satisfactorily at all altitudes and, at the same time, make vertical take-offs and landings under full control. Also, the RVTO will be able to glide steeply on the rotor system without power under full cyclic control at speeds not to exceed one-half of the stalling speed of the standard fighter.

The present invention discloses an RVTO which combines the clipped wing, high speed airplane with a jet driven cyclic controlled rotor system universally mounted on the tail of a turbo-jet driven body. The fixed wing of the aircraft is designed for maximum efficiency and maneuverability at a predeterminedly desired speed and altitude, and is not compromised by considerations for take-off and landing but designed for flying only. In this manner, subsonic, transonic, and supersonic aircraft can be simply and ruggedly built with wing structure of the size, plan-form, and proper angle-of-incidence to insure maximum aerodynamic efficiency at design flight conditions. In view of such considerations, it is necessary to have only sufficient wing area to give proper aileron action, for example, at the cruising speed of the aircraft or at the conversion speed of fixed-to-rotary wing flight which in a fighter aircraft may be as high as two hundred miles per hour.

If a turbo-jet by-pass or ducted fan power plant is utilized as the power source for the rotary jet system, rotary wing flight is accomplished by deflecting the turbo jet exhaust into hollow rotor blades. Sufficient air is added by either a ducted fan or an injector duct system to sufficiently cool the jet blast which is exhausted at the tips to drive the rotor without damage to the structure of the rotary system. Part of the deflected blast of the power plant goes through the rotor blades to the tip jet but a large proportion is deflected downward and slightly outward to produce reversed thrust. Accordingly, a jet rotor asembly is provided for take-off and landing in the form of a mechanical powered parachute applied to a fixed wing jet aircraft in a manner to improve high speed performance without adding redundant structure. In addition, a vehicle with such an improved jet rotor assembly results in a fixed wing structure which does not interfere with the downwash of the rotor blades and provides directional control by suitable movement of the lateral control surfaces when the vehicle is in a steep or vertical flight attitude.

Thus, the present invention provides an aircraft which can fly faster, higher, and with more usefulness than the conventional aircraft, while being capable of operating from small landing and take-off areas. Further, the present invention utilized as a fighter interceptor, drone aircraft or as a missile will be capable of take-off and autorotative landing without power under severe weather and landing terrain conditions. Also, the arrangement of the aircraft is such that the pilot's position is conventional in every way during fixed wing flight and, at the same time, improved over that of any position which has heretofore been suggested or known for the pilot of a vertical take-off aircraft. In the present RVTO, the pilot is sitting facing outwardly for vertical flights and landings looking out the top of the cockpit canopy with his feet under the dashboard. While in known VTO or Pogo stick type aircraft the pilot is lying on his back and looking over his shoulder in order to observe take-off or landng conditions.

Further, it should be obvious that the disclosed RVTO is a more compact aircraft than either the conventional interceptor fighter or the standard vertical take-off configuration. The center-of-gravity of the RVTO will not be over 5 to 10 feet off the ground and its wing span will be much smaller than is required for the equivalent conventional aircraft having equivalent performance characteristics. In general, the tread of the landing gear will be proportionately narrower and the whole structure will be lighter and more rugged with a resultant increase in range and lower gross weight to improve overall maneuverability and design characteristics.

Furthermore, the rotor arrangement of the disclosed RVTO is capable of functioning in the manner of a "maple seed" type parachute structure by autorotation of the rotor blades for safely gliding the craft to the ground in the event of engine power failure while in flight, like other forms of rotary wing aircraft.

An object of the present invention is the provision of a rotary vertical take-off aircraft having a greater measure of utility and safety than the present conventional type aircraft.

Another object of the invention is to provide an aircraft combining the hovering and slow landing features of a helicopter with high speed characteristics of the conventional or VTO and VTOL airplane.

A further object of the invention is the provision of a vertical take-off rotary aircraft adapted to use retractable lifting rotors for hovering and capable of safe power-off descent, and provided with a fixed wing and conventional jet type engines for high speed operation.

Other objects and many of the attendant advantages of this invention will be readily appreciated as the same becomes better understood by reference to the following detailed description when considered in connection with the accompanied drawings in which like reference numerals designate like parts throughout the figures thereof and wherein:

FIGURE 1 is a side elevation of a preferred embodiment of the invention, showing the RVTO in take-off, landing or steep flight position with the rotor blades in steep vertical flight position and, alternatively, in their feathered trailing position as in fixed flight;

FIGURE 2 is a front elevation of the preferred embodiment showing the rotor blades in their feathered and trailed position, such as in fixed flight;

FIGURE 4 is a sectional view of the rotor control system of the preferred embodiment showing suitable rotor blade controls;

Figure 6:
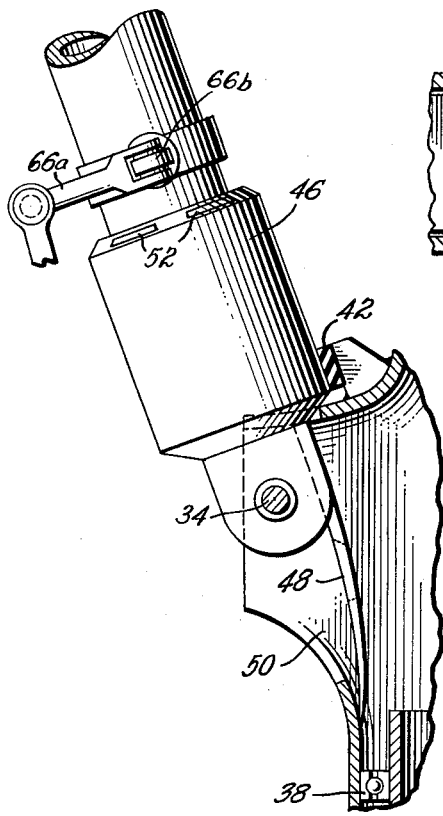
FIGURE 6 is a sectional view of the hub and rotor blade showing the coaction therebetween.

Referring now to the drawings, there is illustrated a preferred embodiment of an RVTO aircraft 10 comprising a short fuselage 12 without a conventional empennage structure but provided with a plurality of rotor blades 14 suitably mounted for rotation at one end thereof. A small fixed wing structure 16 rigid with the fuselage 12 is provided for high speed level flight wherein the wing area is designed for maximum efficiency and maneuverability at design speed and altitude. As can be seen from FIGURE 1, the ground attitude of the RVTO is with the fuselage's longitudinal axis 18 being substantially vertical but tilting slightly backward. In this manner, the pilot is seated in an upwardly reclining position and faces outward, while sufficient clearance is provided for an individual to walk under the rotor blades during rotary take-off or landing.

Fuel is carried in the wing and in wing tanks 20 fixed to the sweep-back wings 16. For purposes of illustration, the tanks are provided with fixed or retractable landing gear 22, to form a landing gear assembly. However, in most aircraft, it is desirable to secure the landing gear to the main wing structure. The power plant 15 may be a conventional turbo-jet or any other gas turbine or engine type adaptable to drive the rotor blades 14, as hereinafter disclosed.

Figure 3:
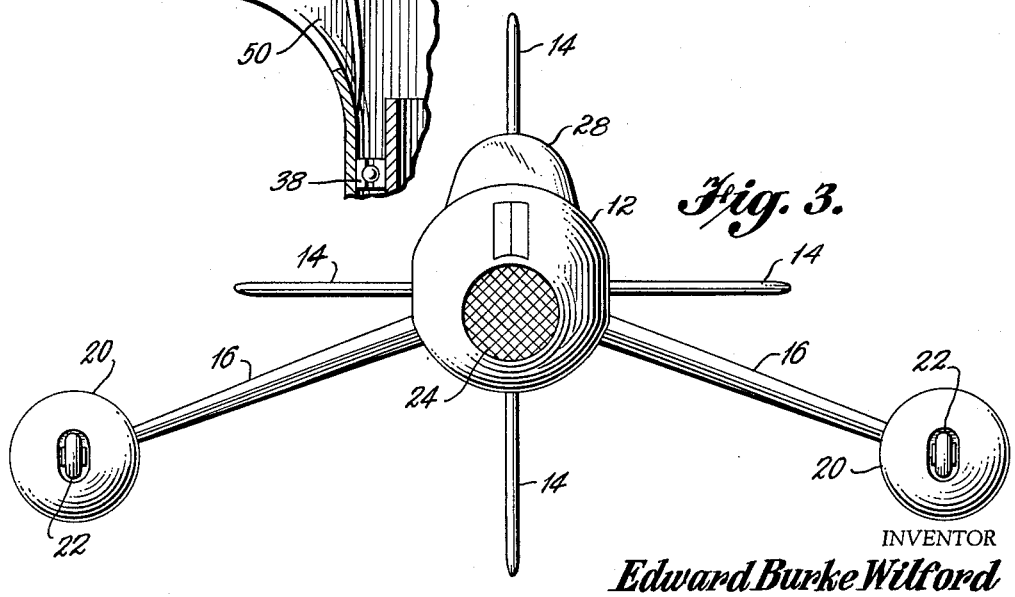
FIGURE 3 is a front view of the aircraft in level flight orientation showing the cathedral type of wing construction and the front view of the feathered and trailed rotor blades.

The structural details of the preferred aircraft, as seen in FIGURES 1 through 3, are arranged in accordance with well known aerodynamic principles for minimum interference drag between its component parts. The various components, such as the wings and fuselage, are a function of the particular design and use while the frontal and wing area is maintained at a minimum. The present RVTO will have a lower frontal area which will not exceed 75% of the wetted area of a conventional aircraft of equivalent size and power. Thus, the inherent freedom of selecting the appropriate wing area and not compromising it for landing or take-off will result in higher performance characteristics not so readily obtainable in present aircraft of a similar type.

In FIGURE 3, it can be seen that certain of the rotor blades 14 can function as a trailing fin and rudder assembly when the aircraft is in a fixed-wing conventional flight position, while other of the rotor blades 14 will serve as stabilizer and elevator. The air intake 24 is provided with a retractable or adjustably positioned screen, as shown, to protect the power plant or engine from entrance of foreign matter since the attitude of the aircraft when landed places the engine air intake relatively close to the ground.

FIGURE 1 indicates that the contoured or form-fitting pilot's reclining seat 26 in the fuselage cockpit gives good vision in both vertical and horizontal flights and allows the pilot to endure high accelerations. If desirable, the seat 26 may be adjusted for elevation and vision, and if necessary, for contour adjustment. The pilot enters and leaves the aircraft by raising the cockpit canopy 28. If desired, the canopy may be manually or mechanically controlled depending on the desires of the particular pilot, and can be automatically removed or ejected for quick egress in case of emergency. A retractable nose landing gear 30 is provided, cooperating with fixed or retractable landing gears 22 usually mounted on the wings; but herein shown and above described in connection with the wing tip gas tanks 20. The nose and wing tip gas tank landing gear may be retracted by utilizing conventional manual or automatic retracting mechanisms.

Each of the rotor blades 14, as shown in FIGURE 4, are adjustably mounted on a rotor hub 32 by a trailing hinge 34 having a length greater than the cord of the individual rotor blade for suitable structural and dynamic stability. The hub 32 having an axially and rearwardly opening outlet 33 for exhaust gases is rotatably mounted with respect to the primary structure of the aircraft to provide simple means for the transmittal of a portion of the engine tail pipe blast to the blade tips while permitting suitable control of the rotor system. The hub is rotatably and coaxially mounted on a tail pipe 36 operatively associated with a conventional jet engine, not shown. In this manner, the hub is free to rotate about the longitudinal axis of the aircraft and, of course, of the tail pipe 36. The hub is radially separated from the tail pipe 36 by a plurality of self-aligning bearings 38, of any suitable design, which facilitates the rotation of the hub while permitting thermal expansion between the hub and the tail pipe.

The hub 32 is also rotatably mounted on the primary structure of the fuselage 12 through a plurality of suitable thrust and radial bearings 40 which permit rotation of the hub and allows a minimum axial displacement of the hub relative to the fuselage. Resilient trailing stops 42 (FIG. 6) are suitably provided on the hub and set to permit a substantially large trailing angle for the blades in forward flight; for example, up to an angle of 15 degrees with the longitudinal axis or center line of the aircraft. In this manner, the rotor blades 14, when in the full feathered condition or attitude, serve as a control tail assembly whether turning slowly or completely stopped relative to the fuselage. In addition, the jet driven rotor system of the aircraft requires little or no torque reaction and rotational control of the vehicle is supplied by aileron-elevators 44 on the fixed wing which serve to suitably rotate the aircraft about its longitudinal axis in vertical flight. The aircraft can be tilted by the lift vector of the rotor through a cyclic pitch control system, hereinafter disclosed.

Figure 5:
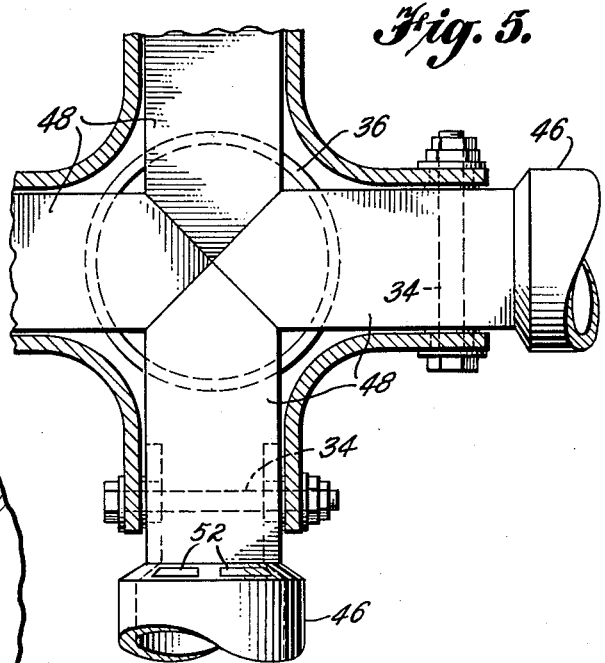
FIGURE 5 is a sectional view of the jet deflectors incorporated into the rotor hub.

The hub 32 is basically a shell type construction of such material as temperature resistant alloy steel, or the like, and properly insulated from the heat of the jet blast in the tail pipe 36 through a suitable layer of air between the hub and the tail pipe. Rotor blades 14 are mounted on the hub closely adjacent the hub outlet 33, as shown in FIGURE 4, by means of the trailing hinges 34 and the root and blade supporting sleeve journal means 46 rotatably supporting a respective blade 14 therein. Rigid with and extending generally longitudinally of the blade supporting or root and journal means 46 are a number of movable reflectors 48 which in vertical flight are in a closed or blocked position relative to the axial outlet 33, as shown in FIGURES 4 and 5, to divert the jet's stream substantially 90° into the hollow blades 14 with a large portion of the gas stream deflected slightly outwardly and downwardly alongside of hub 32 and forwardly of the rotor blade journal means 46 from suitable lateral openings 50 in the hub. Prior to its entrance into the hollow rotor blades, the exhaust gas becomes mixed with ambient air entering through apertures 52 provided in the base of each of the journal means 46 to reduce the temperature of the jet flow to an amount lying within the safe strength limitation of the particular material utilized in the construction of the rotor system. As shown in FIGURE 6, in their open position, the deflectors 48 allow the jet gases to pass directly aft from the power plant to the atmosphere. Thus, in response to rotor blade position, the deflectors are actuated to either an open or closed attitude to predeterminedly control the direction of the jet blast.

As previously disclosed, the blades 14 are of a hollow construction to permit ducting portions of the jet blast to openings adjacent the rotor blade tip ends. The blades adjacent their tips are each provided with a suitable jet orifice 51 (FIG. 1 or 2) in its upper surface near the trailing edge to efficiently exit the hot gases flowing through the blades to generate sufficient reaction thrust to effect blade rotation to propel and aerodynamically support the aircraft in slow and steep flight. Accordingly, it is desirable that the rotor blades should be constructed of such material as stainless steel, or the like, of high temperature resistant, high strength material. The interior of the blade may be coated with ceramic to further protect the structure from deleterious thermal effects. In addition, the hot jet blast travelling through the rotor blades may include means providing a surrounding layer of cooling air as it goes through the blade to increase the service life of the rotor blade structure.

The blades 14 are provided with a suitable cyclic and collective pitch control of any well-known type. The high trailing angle stops 42 (FIG. 6), used to limit trailing blade angle may be made adjustable to vary the degree of blade trailing initiated by the pilot. In combination with suitable control of the blades in the retracted position, variably adjustable stops would permit control of the blades when used as rudder and elevator. For example, the whole trail may be suitably spread for high altitude flight.

Referring to FIG. 4, the rotor blades 14 are controlled throughout their coning or trailing range, from folded to extended positions, by means of a swashplate assembly 54 which provides cyclic and collective pitch control of the rotor blades. The swashplate assembly comprises a slidable collective or total pitch ring-like member 56 splined to splines 57 on the hub 32 for axial movement relative thereto without any relative rotation therebetween. An inner gimbal or swashplate member 58 is mounted on the slidable collective pitch member 56 for relative universal motion thereon. An outer gimbal member 60 is freely and rotatably mounted on the universally mounted inner swashplate member 58 and separated therefrom by a plurality of thrust and radial bearings 62 for relative rotation therebetween. A number of cyclic pitch control arms or linkages 64 are universally connected to the swashplate member 60, only one being shown in FIGURE 4, with a 90° spacing from each other. The collective pitch member 56 is correspondingly connected to a plurality of collective pitch control arms 64a, only one of which is shown in FIGURE 4, disposed at 90° to the cyclic pitch control arms 64. The control links or arms 64, 64a connect the swashplate assembly to the pilot controls, not shown, in a conventional manner well-known in the prior art. The outer gimbal member 60 is operatively coupled to each of the rotor blades by a pitch control link 66 universally connected to the outer gimbal member 60 and pivotally connected to each shank of the blades by means of a link 66a which in turn is pivotally connected to a pitch control arm 66b rigid with and extending forwardly of the blade and lying within its chordal plane. The outer gimbal member 60 is connected to the hub 32 by means of a hinged linkage 68 for rotation therewith. The swashplate member 58 is coupled to the primary structure of the fuselage 12 through a hinged linkage 70 to prevent rotation of such member with the hub 32.

Each of the rotor blade pitch control links 66 at one end is universally connected to the outer gimbal member 60 and blade pitch lever 66b at a point forwardly of the leading edge and direction of rotation of the related rotor blade. In this manner, each link 66 will accurately control the angle-of-attack of the rotor blade even when the blade goes from a horizontal to a substantially vertical position. The rotor blade pitch control assembly 54 is connected by the pitch control arms 64a and 64 to the pilot control stick, as previously disclosed, so that for collective and cyclic pitch control the swashplate is moved up and down by the collective pitch arm 64a and tilted by the relative movement of swashplate 58 by the pitch arms 64 and 64a mounted 90 degrees to each other. The pitch control arms 64 and 64a are directly connected to the control stick and to the fixed wing longitudinal controls for unified aircraft control.

In this manner, actuation of the pitch control arms 64, 64a by the pilot will move the swashplate in either cyclic or collective control of the rotor blades in response to the manual control by the pilot and are under continuous control by the pilot whether the blades are in the feathered and trailing position as in forward flight, or at some angle of positive or negative pitch in vertical flight. In high speed control (see FIG. 2), the wings 16 with combined aileron elevator controls 44 cooperate with the trailing blade rudder and elevator system, disclosed above, to suitably control and stabilize the aircraft in flight.

In the operation of the preferred embodiment 10, the pilot is seated in a slightly reclining position with respect to the ground, with a clear view forward and upward through the top of the canopy 28 (FIGS. 1 and 2). In forward flight, the attitude of the RVTO is such that the pilot reclines and looks forward and slightly upwards. This is a comfortable position and one which gives a better view of the entire sphere of operation than is possible in conventional pilot seats or in a prone pilot position. The contoured pilot seat 26 gives good visibility and, at the same time, allows the pilot to endure more acceleration loading than is normally possible in a conventional seating arrangement.

The nose landing gear 30 is retractable into the fuselage 12, and the landing gears 22, for the purposes of illustration, are correspondingly in a faired position relative to the wing tip tanks 20. On the ground, the aircraft forms a tripod type of landing gear which substantially eliminates any possible ground instability. Also, on the ground the landing gear gives a slight rearward tilt to the aircraft to permit the pilot better visibility for landing and take-offs. It is to be understood that with the rotor blades 14 disposed in the solid line position shown in FIGURE 1 prior to their rotation by the engine exhaust gases, as described, suitable stop abutment means may be provided if desired, but not shown, to limit the static downward tilt of the blades.

In landing, contact with the ground can be made on the two wing-tip wheels 22 and brought forward on the fuselage nose wheel 30 by the cyclic control of the rotor system. If an autorotative landing is made requiring a slight ground run, it is made in a similar manner. The landing gear attached near the vicinity of the wing tips and with the fuel in wing tip tanks gives the best chance for survival in the event of engine failure occurring at very low altitude, before autorotation can be effected, whereby a complete crash, ground loop, or nose-over might possibly occur. The damage in such cases would be taken by the rotor blades and the wing tips rather than that portion of the fuselage which contains the pilot.

In the performance of the preferred embodiment 10, since the RVTO has a low frontal area, the drag will be appreciably reduced and, in turn, the power requirement is reduced. Also, the RVTO has substantially 60 to 75% of the wetted area, outer surface exposed to the air, of an equivalent conventional aircraft, to further reduce the drag losses. Performance is also enhanced by the absence of a propeller which would limit maximum speed, and since the rotor blades 14 trail in high speed flight, drag from the rotor system, as in conventional vertical take-off aircraft, is substantially reduced. In addition, the present RVTO can be designed for low, medium or high altitude operation by suitable selection of proper wing area.

In brief, the use of the present RVTO eliminates the need for large and exposed airports. A paved area from one to four acres will provide parking and operational facilities for four to eight RVTO interceptor fighter type aircraft. On a vessel, deck space of 50 by 100 feet should suffice for flight operations with a minimum of hangar facilities for storage and servicing. Existing small commercial airports can be used with intermediate heliports placed strategically in rural areas to supplement and fill out the regional defensive heliport system. In addition, in carrier and convoy missions a number of escort or cargo ships can be easily armed with fighters of the RVTO type with slight modification for take-off and landing facilities. Landing with the RVTO is estimated not to exceed 50 miles per hour with power failure or fuel exhaustion in spite of supersonic speed capability at altitude. If the preferred embodiment is utilized on an aircraft carrier, the aircraft can be catapulted with its rotor blades in the trailing position to further increase the operational function for defense purposes.

Figure 7:
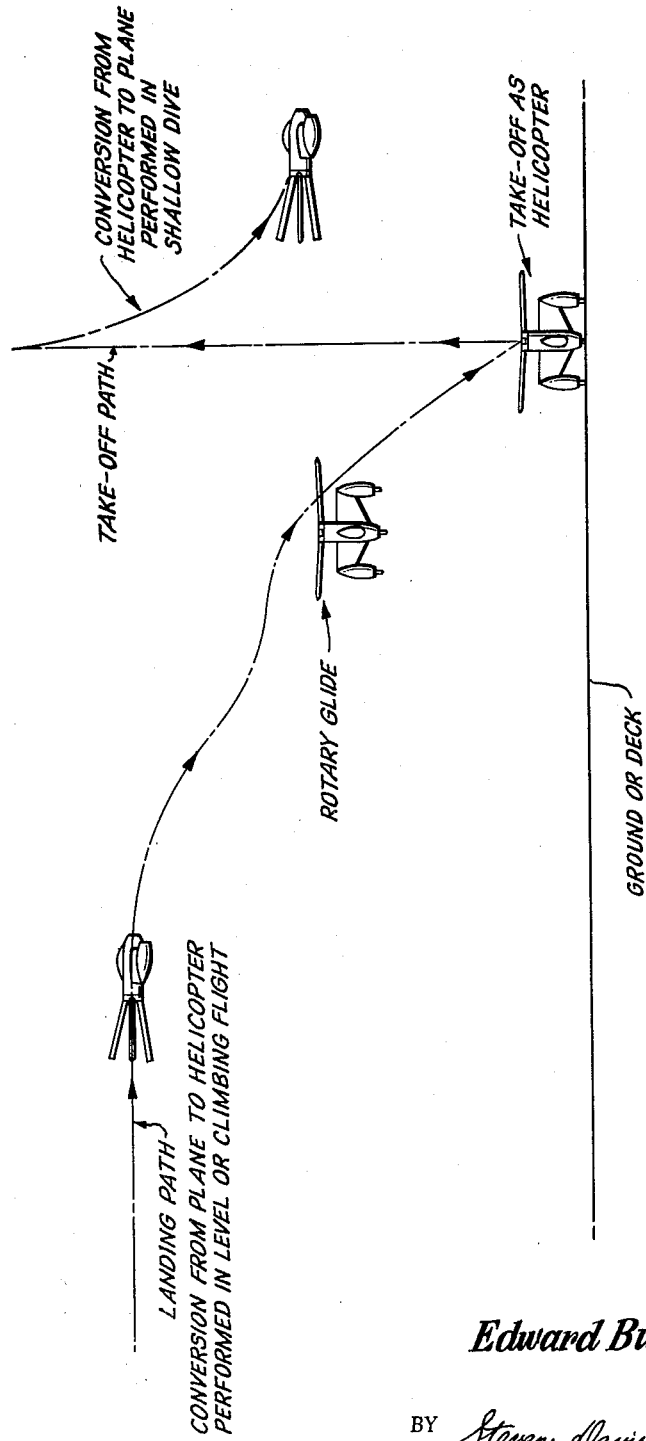
FIGURE 7 is a diagrammatic view illustrating typical flight-conversion paths of the RVTO.

In the operation of the disclosed aircraft, FIGURE 7 illustrates a typical flight path of the preferred embodiment wherein the RVTO is shown in its normal take-off position on a level supporting surface which may comprise, for example, the ground or the deck of a ship.

For take-off, the rotor blades are disposed in approximately the solid line position shown in FIGURE 1 with initially a substantially zero, or preferably, a slightly negative pitch to hold the aircraft down on the take-off surface, by adjustment of the collective pitch arms 64a. The jet or equivalent engine of the aircraft is assumed to be operating at this time at "idling" speed with the rotor blades maintained in extended position under the action of centrifugal force. On increase of engine speed, a portion of its exhaust gases is deflected into the hollow blades, as indicated in FIGURE 4, for exhausting through the jet apertures 51 in the upper surfaces of the blades 14. In a manner well-known, the blades are rotatably driven by the reactive forces created by the exhaust jets flowing through the jet apertures 51. When the rotor blades 14 attain a normal flight take-off r.p.m., they are given a positive collective pitch adjustment of from five to fifteen degrees by an upward movement imparted to the collective pitch ring member 56 through actuation of the control arms 64a by the pilot. This causes the blade to acquire aerodynamic lifting force causing the blades to cone slightly and lifting the aircraft from its take-off position by the vertical components of lifting force acquired by the rotor blades. Since an upward flight path inclined to the vertical is more desirable for various reasons than a strictly vertical take-off path, both of the cyclic and collective pitch control members are actuated to provide the desired upwardly flight path.

When a desired and safe altitude is reached for shifting to conventional horizontal fixed-wing flight, the throttle of the engine (not shown) is partially closed and the collective pitch arms 64a are actuated to obtain a rapid collective pitch change of the rotor blades from their more or less slightly positive pitch angle to a substantially large negative pitch angle. While this adjustment causes a slowing down in the rotation of the rotor system the blades however at this time still maintain control of the attitude of the aircraft by means of its cyclic and collective pitch control mechanism to provide directional and horizontal control in a manner corresponding to that provided by the rudder and elevator of conventional airplanes. The RVTO, by reason of loss in lift in its rotor blades, enters into a dive, preferably shallow, under the control of its then slowly rotating rotor blades which have by this time lost most of the effect of centrifugal force acting on them. Due to the increase in speed in the nose-downward movement of the aircraft by the action of gravitational forces and the air resistance or drag action acting on the rotor blades 14 the latter are automatically swung or moved to the trailing position as determined by stops 42 (FIGURE 6), with the leading edges of the blades all facing outwardly. At this time the blades can be slowly turning or stationary in relation to the fuselage 12, depending on the adjustment of the pitch control mechanism.

When it is desired to land from a conventional horizontal fixed-wing flight path, the aircraft is placed in a shallow dive with a cut-back on the engine throttle. At this time the rotor blades 14 are in their fully trailing position against stops 42 and the pitch of the blades and their pitch adjusting arms 66b, which as previously stated extend forwardly therefrom in the plane of the blade chord, are at a small relative negative angle, i.e., at an angle negative with respect to radial planes in their coned or trailing position. In converting the RVTO from the fixed-wing to rotary-wing flight the pilot moves the collective pitch linkage arms 64a downwardly in FIGURE 4 to place the rotor blades 14 in a positive pitch angle adjustment of from 2 to 5 degrees to the flight path through movement of the blade pitch arms 66b from their negative pitch setting while in their trailing position. This adjustment causes the blades to move through a positive pitch angle about their pitch axes whereby the aerodynamic lift of the blades induces autorotation of the blades whereby their rotational speed gradually increases. As the speed of the aircraft is slowed up by the action of the rotor due to the increase in the speed of blade autorotation the cone of the rotor begins to flatten under the influence of increased centrifugal force and, by appropriate pitch adjustment, the rate of descent of the RVTO aircraft is thereby slowed down. As the cone formation of the rotor blades approaches its flattened condition the deflectors 48 on the rotor blade journal members 46 approach their closing or blocking position relative to the rearwardly flowing engine jet exhaust toward outlet 33 in the rotor hub 32, FIGURE 4, whereby the pressure of the exhaust gases reacting against the deflectors aids in returning the rotor blades 14 to their flattened or extended flight sustaining positions as well as deflecting a portion of the exhaust gases into and through the hollow blades to blade jet orifices 51 as well as downwardly or alongside of the hub 33, as previously explained. Accordingly, by appropriate adjustment of the pitch control mechanisms, through manipulation of control arms 64 and 64a, the RVTO can be landed in any desired glide path, such as the one indicated in FIGURE 7.

Should engine or power failure occur while the aircraft is airborne at a sufficiently high altitude, either in conventional fixed-wing flight or rotary-wing flight, it can be safely landed in the RVTO position shown in FIGURES 1, 2 and 7 by employing the rotor blades to function in the manner of "maple leaf" parachute devices by means of effecting autorotation of the blades. Under such emergency conditions, should the aircraft be in horizontal, conventional fixed-wing flight it can be controlled and landed in the manner described in the preceding paragraph. From a vertical or rotor-sustained flight the RVTO in such an emergency would correspondingly be safely lowered similarly by means of the induced autorotation of the rotor blades 14 effected by appropriate adjustment of the cyclic and collective pitch control arms 64, 64a.

In conclusion, the present invention discloses an aircraft which will fly faster, higher, and maneuver more satisfactorily at all altitudes than either the conventional type of jet powered plane or the conventional vertical take-off aircraft. The RVTO will be able to glide in without power under full control at speeds not to exceed one-half of the stalling speed of a conventional aircraft.

While the invention has been shown and described in accordance with the patent statutes it is to be understood that various changes in the details of the structure may be made without departing from the spirit of the invention. It is desired, therefore, that the invention be limited only by the scope of the appended claims.

What is claimed is:

1. An aircraft having a body, fixed wing structure mounted on said body, a jet engine tail pipe mounted within said body adapted to be operatively associated with a jet power plant, a rotor system having a plurality of rotor blades operatively mounted on said body, said rotor blades being pivoted to move about axes transverse to the line of flight, from a laterally extended position for take-off and landing to a trailing position extending rearwardly of said body, pitch control means operatively associated with said rotor system for feathering said rotor blades in said trailing position from said body to thereby place the aircraft loading on said wings, deflecting surface means operatively associated with said tail pipe and said rotor system to deflect a jet blast from said tail pipe in accordance with the position of said rotor blades with respect to said body.

2. A rotary wing aircraft capable of both vertical and horizontal flight, comprising a fuselage, power plant tail pipe means mounted within said fuselage, wings secured on said fuselage to sustain the aerodynamic loading in high speed flight, landing gear means operatively associated with the forward end of said fuselage and wings for supporting the aircraft on its nose, a rotor system including rotor blades and a rotor hub assembly rotatably mounted on said fuselage and operatively coupled to said power plant tail pipe means for actuation thereby, rotor control means coupled to said rotor system for predetermined actuation of said system from a laterally extended rotor position for vertical flight to a trailing position for fixed wing flight.

3. The invention as defined in claim 2 wherein said rotor system is provided with jet blast deflecting means for predeterminedly controlling the jet blast from said power plant tail pipe means, each of said rotor blades adjustably mounted on said hub and having means at the tip thereof for transferring the jet blast from said power plant tail pipe means into thrust for rotation thereof, said control means universally mounted to the shank of each of said rotor blades for changing the blade pitch to predeterminedly place said rotor blades in a trailing attitude with respect to said fuselage for horizontal flight and in a rotational attitude for vertical flight and stop means operatively associated with said rotor hub for limiting the trailing angle of said rotor blades.

4. A vertical take-off aircraft adapted for both vertical and horizontal flights by predetermined control of rotor blades mounted thereon, comprising a fuselage having a wing structure secured thereto, a jet power plant tail pipe means mounted within said fuselage, a rotor system rotatably mounted on the aft end of said fuselage and driven by the jet blast from said jet power plant tail pipe means, deflector means coupled to said rotor system for deflecting the jet blast thereto, a number of rotor blades integral with said rotor system movable from a laterally extended position for take-off and landing to a trailing position to form the aircraft empennage, adapted to serve as an elevator, stabilizer, rudder and fin in high speed horizontal flight.

5. A jet powered aircraft having a fuselage, fixed wing structure mounted on said fuselage, tail pipe means of a jet propulsion power means mounted within said fuselage, pilot control means, a rotor system mounted at one end of said fuselage, means for operatively coupling said pilot control means with said rotor system for changing the direction of the jet blast from said jet propulsion tail pipe means from a rearward direction in forward flight into said rotor system for take-off and landing, rotor blade means pivotally associated with said rotor system said rotor blade means pivoted to move about axes transverse to the line of flight from a laterally extended position for take-off and landing to a trailing position extending rearwardly of said fuselage and having conduit means for operatively transmitting the jet blast from said tail pipe means to the tips thereof, to thereby rotate said blade means about an axis of said fuselage, and said rotor blade means being coupled to said pilot control means for feathering said blades into a trailing position with respect to said fuselage.

6. An aircraft having a body, a small wing fixed to said body, tail pipe means for a power plant operatively associated with said body, a landing gear assembly maintained on said wing and body, whereby the aircraft rests substantially on its nose when in non-flight, a rotor operatively mounted with respect to said tail pipe means for driving purposes and coupled to said body whereby to lift the aircraft relatively backward into the air, said rotor having deflector means mounted thereon extending into said tail pipe means, control means coupled to said rotor for predetermined actuation thereof, whereby said rotor is placed in a trailed position in flight and in an extended position for landing.

7. A convertible aircraft having a body, a small wing fixed to said body, tail pipe means for a power plant mounted on said body, landing gear means fixed to said body and wing to hold the aircraft in a substantially vertical, nose-down position when in contact with the landing surface, a rotor operatively coupled to said body and said power plant tail pipe means for driving purposes and adapted to be extended laterally of said body for take-off and landing and to trail rearwardly of said body in flight, said rotor having deflector means mounted thereon extending into said tail pipe means, control means coupled to said rotor for simultaneous and cyclic pitch control, said control means being operative to effect movement of said rotor to and from its laterally extended and trailing positions.

8. An aircraft comprising a jet power plant tail pipe exhaust means, a rotor blade system including a plurality of rotor blades universally mounted for rotation about a fore-and-aft axis, means for deflecting gases from said jet power plant tail pipe exhaust means to rotate said blade for take-off, means to direct the gases from said jet power plant tail pipe exhaust means rearwardly of said aircraft for flying, and means operable to induce aerodynamic loading on said rotor blades to control and position them for gliding and landing.

References Cited in the file of this patent
UNITED STATES PATENTS

| | | |
|---|---|---|
| 2,622,826 | Prince | Dec. 23, 1952 |
| 2,690,886 | Laskowitz | Oct. 5, 1954 |
| 2,808,115 | Peterson | Oct. 1, 1957 |
| 2,866,608 | Leonard | Dec. 30, 1958 |
| 2,953,319 | Gluhareff | Sept. 20, 1960 |